July 29, 1958      D. R. VOMACKA      2,845,092
VALVE SYSTEM FOR WATER SOFTENERS
Filed Oct. 4, 1954      2 Sheets-Sheet 1
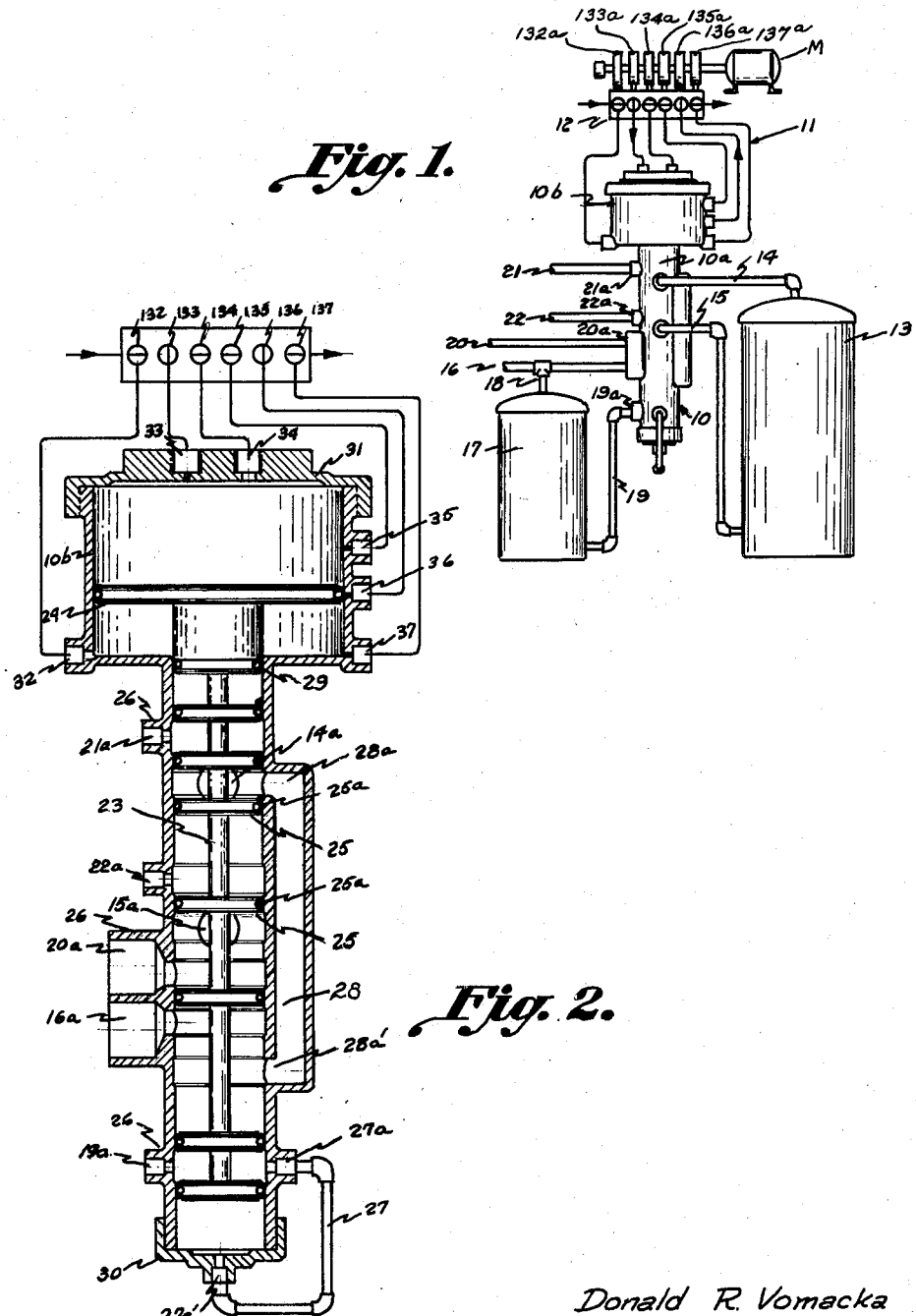
Donald R. Vomacka
INVENTOR.
BY Jerome F. Fallon July 29, 1958
D. R. VOMACKA
2,845,092
VALVE SYSTEM FOR WATER SOFTENERS
Filed Oct. 4, 1954
2 Sheets-Sheet 2
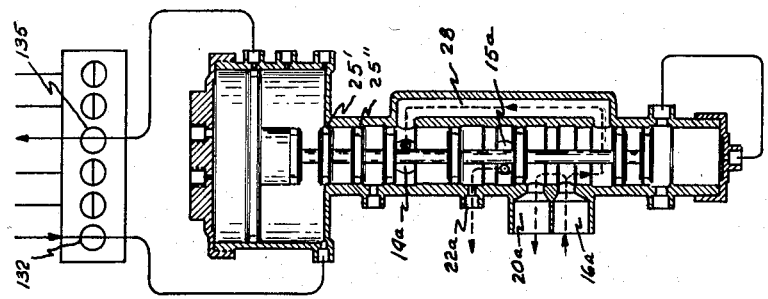
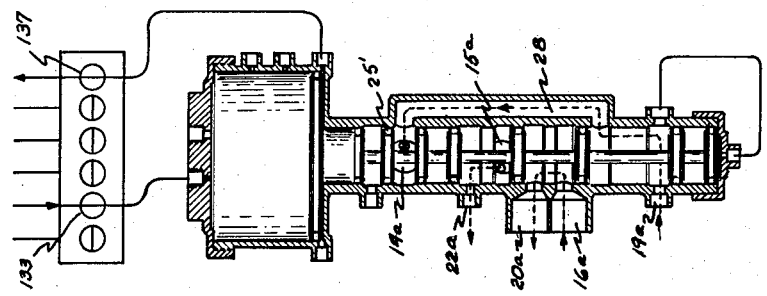
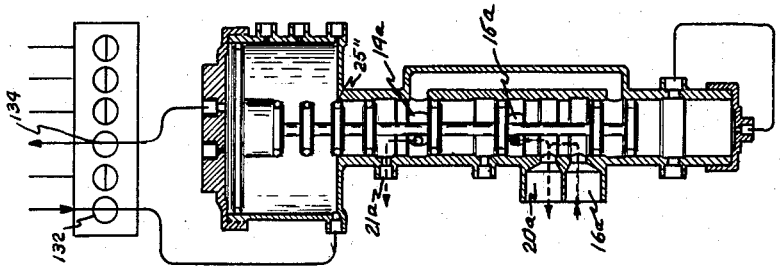
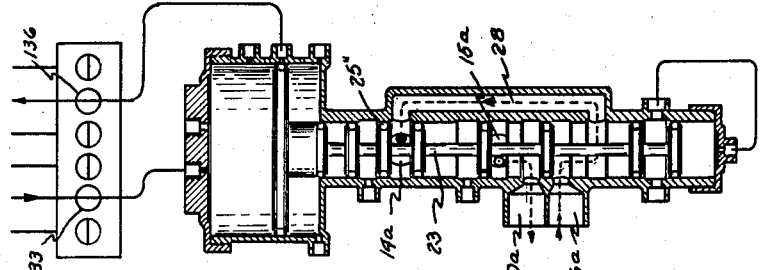
Donald R. Vomacka
INVENTOR.
BY Jerome F. Fallon

United States Patent Office 2,845,092
Patented July 29, 1958

---

2,845,092

VALVE SYSTEM FOR WATER SOFTENERS

Donald R. Vomacka, Chicago, Ill.

Application October 4, 1954, Serial No. 459,949

4 Claims. (Cl. 137—633)

This invention relates to a positioner for a multiple position valve stem, and, more particularly, to a positioner for the multiple position valve stem of a control valve useful in connection with water softening apparatus.

The positioner of my invention is designed for use with a valve stem operating in a multi-ported housing whereby the directions of flow of various fluids can be controlled. Such a valve is commonly incorporated in high quality water softening apparatus where the "zeolite" bed is subjected to a three-phase regenerating cycle in addition to general or service phase. For example, when the zeolite bed loses some of its potency for removing the hardness elements from water (e. g., calcium and magnesium ions), it is regenerated as follows:

(1) High velocity countercurrent flushing with untreated water to remove mud, silt and other debris and maintain the bed in a fluid state by uncaking the settled particles;

(2) Direct current regenerating with a brine solution; and (3) Direct current rinsing with untreated water to remove any occluded brine.

Heretofore, the control valves capable of achieving the four phases outlined above were either manually operated, or, if automatic, were so intricate as to be prohibitive in cost to install and maintain. The less intricate valves currently used are adapted to operate normally through the service and brining phase. In order to achieve rinsing an auxiliary valve must be used. However, notwithstanding the auxiliary valve there is still no provision for countercurrent flushing which is essential for promoting long bed life.

Because the positioner of my invention is adapted to be automatically controlled, a control valve equipped with such a positioner overcomes the aforementioned drawbacks by providing an automatically controlled valve unit that is simple and rugged in structure and inexpensive to install and maintain. A valve equipped with the positioner of my invention but adapted to be manually operated is still superior to the previously known manually operated multiple ported valves since the positioning of my valve unit can be achieved directly and exactly, and without any need on the part of the person operating the valve to gauge the position of the valve stem.

Essentially, the positioner of my invention includes a housing and, slidably mounted therein, a portion of the valve stem operable to direct various fluid flows in a multiple ported valve. A piston is mounted on the housed portion of the valve stem. The housing itself is provided with a series of ports to admit and vent a pressurized fluid to move the piston. Associated with the aforementioned ports is a second control means such as electrically operated pilot valves for selectively directing the flow of the pressurized fluid.

It is, therefore, an object of my invention to provide an improved, yet simple, positioner for a multiple position valve stem. Another object is to provide a positioner for the valve stem of a control valve of a water softening apparatus that has a three-phase regenerating cycle. Still another object is to provide a positioner that automatically positions a multiple position valve stem. Other objects and advantages of my invention will be seen as the specification proceeds.

My invention will be explained in conjunction with the accompanying drawings in which:

Fig. 1 is a schematic presentation of a water softening apparatus including a multiple ported control valve equipped with the preferred embodiment of my positioner;

Fig. 2 is an enlarged elevational view partially broken away of the control valve unit portion of Fig. 1;

Fig. 3 is a diagrammatic view depicting a control valve for water softening apparatus equipped with the positioner of my invention, and with its valve stem positioned for general service, i. e., delivering treated water;

Fig. 4 is a diagram similar to Fig. 3 but with the valve stem positioned for countercurrent flushing;

Fig. 5 is a diagram similar to Figs. 3 and 4 but with the valve stem positioned to deliver brine for regeneration; and Fig. 6 is a diagram similar to Figs. 3–5 but with the valve stem positioned to deliver raw water for rinsing brine from the regenerated zeolite bed.

Referring to the drawing, Fig. 1 shows one environment in which a multiple-ported control valve having a stem equipped with the positioner of my invention may be used. Therefore, my invention will be described in connection with the pictured schematic water softening system for ease of understanding. However, it is to be clearly understood that I do not limit my invention to any one use, since it is adaptable to any installation where a multiple ported valve housing is useful. In conjunction with the water softening apparatus shown, I use the term "zeolite" to described the mineral bed. However, I do not limit myself to any particular form of mineral, using the term in its general or popular sense. In Fig. 1, the numeral 10 indicates generally a control valve and its positioning means. The preferred embodiment of my invention includes a substantially cylindrical valve housing 10a and integral therewith and located axially thereto, cylindrical positioner housing 10b. Associated with positioner housing 10b and connected therewith by means of piping, generally designated 11, is automatic pilot valve 12.

The typical water softening apparatus has the following elements operatively connected. Tank 13 is connected to control valve 10 by means of piping 14 and 15. Tank 13 contains a water conditioning mineral such as zeolite, and in the usual phase of operation, raw water enters the top of tank 13 from conduit piping 14 and treated water leaves from the bottom by means of pipe 15. The raw water itself is conducted to control valve 10 by pipe 16.

For regeneration, brine tank 17 is provided and is connected to raw water supply pipe 16 by pipe 18 and with control valve 10 by pipe 19.

Valve 10 is also provided with several outlet ports, one such port, designated 20a, connects to piping 20 leading to the house or other point of use. Ports 21a and 22a are connected by suitable piping 21 and 22 to a drain, port 21a permitting discharge of the raw water used in the high velocity flushing prior to regeneration with brine, and port 22a permitting discharge of brine and rinse water which occurs at a much slower rate. For simplicity, the ports of valve 10 have been given the number corresponding to the piping to which they are attached along with the suffix "a."

Referring now to Fig. 2, an enlarged view is seen of the cross-section of the combined control valve housing 10a and positioner housing 10b. Positioner housing 10b has a greater transverse cross-sectional area than that of valve housing 10a to permit easier movement of valve stem 23 with low pressure fluid. Thus, it is possible to use ordinary pressure raw water to position the valve stem despite the fact that other portions of the valve stem are operating against the same pressure.

A portion of valve stem 23 extends into positioner housing 10b and has mounted thereon piston 24, which is adapted to sealingly slide against the cylindrical side walls of positioner housing 10b. The remainder of valve stem 23 is provided with a number of smaller piston elements 25 adapted to slide in cylindrical valve housing 10a in sealing engagement with the inner side wall thereof. Each piston element 25 is provided with an elastic sealing ring 25a mounted in a peripheral recess in the side wall of piston element 25. The number and spacing of piston elements 25 is determined by the number and arrangements of the ports in valve housing 10, which will be designated by numerals corresponding to the numerical designations of the piping to which they are connected, as explained above, with the addition of the suffix "a."

Valve 10, including valve housing 10a and positional housing 10b, can be a single piece casting. During the forming operation the following ports are provided: ports 14a and 15a communicating with the piping of zeolite tank 13, raw water inlet port 16a, brine port 19a, treated water port 20a, drain ports 21a and 22a for drain piping. Each port is provided with an outwardly extending annular flange or boss 26 which may be internally threaded for ready pipe connection. Four additional ports are provided for two by-pass connections: ports 27a and 27a' are connected together by by-pass conduit 27 to prevent fluid from being trapped in the base portion of valve housing 10a and thus permit stem 23 to be moved downwardly to the bottom of valve housing 10b; and ports 28a and 28a' are connected together by by-pass pipe 28, the function of which will be explained later in the specification.

Referring now to Figs. 3–6, the reader may see the positions of valve stem 23 corresponding to various phases of operation of a water softening apparatus. Fig. 3 shows the service operation position; Fig. 4, the high velocity countercurrent flushing; Fig. 5, the regeneration with brine; and Fig. 6, the subsequent rinsing position.

*Operation*

When valve stem 23 of control valve 10 is in the position shown in Fig. 3, raw water enters port 16a, passes through by-pass 28 and out port 14a into zeolite tank 13. After treatment in tank 13, the water reenters control valve 10 through port 15a and leaves through port 20a to enter pipe 20, thus being available for use.

In Fig. 4, the valve is adapted to permit countercurrent flushing. Therefore, raw water which had entered valve 10 through port 16a as in the "Service" operation, flows out port 15a and back in through port 14a, just opposite to the flow achieved by the Fig. 3 position, so as to run upwardly through zeolite tank 13. The flushing water is then vented to drain through port 21a. In addition, raw, untreated water is available for use should the occasion arise since port 20a is connected internally in valve 10 to raw water coming in through port 16a. It is to be noted that the spacing of piston elements 25 permits such an internal by-pass to be achieved during each of the three phases of regeneration achieved by settings of valve stem 23 shown in Figs. 4–6.

In Fig. 5, corresponding to the brine regeneration phase, raw water again enters the valve through port 16a and leaves through port 20a for consumption. These are the only water connections since there is no need for water elsewhere during this phase. Brine enters through port 19a, flows through passage 28, thence out of port 14a to the zeolite tank 13, in through port 15a from tank 13, and out through drain port 22a.

In the last phase, that of rinsing the regenerated bed, raw water enters through port 16a and flows in two directions: an internal by-pass for service use by flowing out of port 20a as in Figs. 4 and 5, and through passage 28 and out of port 14a to zeolite tank 13. It returns from tank 13 through port 15a and out to drain through port 22a.

Referring again to Fig. 2, and more particularly to positioner housing 10b thereof, it is to be noted that by providing positioner housing 10b as an integral part of control valve 10 and by providing a valve stem having a plurality of chamber-forming piston elements 25 in control valve 10, and still further by providing the uppermost piston element 29 as a part of power piston 24, the need for providing a packing gland or other seal between the positioner cylinder and the valve cylinder is obviated. This achieves simple and inexpensive operation when untreated water is used to power the positioner.

Positioner housing 10b is provided with a plurality of ports in its walls which, like the ports of valve housing 10a, are cast into the structure during forming and equipped with outwardly extending bosses for ready pipe coupling. The ends of the single piece control valve casting are closed by caps designated 30 at the lower or smaller diameter end, and 31 at the upper or larger diameter end. Although these caps are shown threadably received on the ends of control valve 10, they may be attached in many ways known to the art, such as by bolts through companion flanges. The end caps are likewise provided with ports in the pictured embodiment, cap 30 with the heretofore described port 27a' to prevent trapping of water, and cap 31 with a number of ports to be hereinafter described.

Port 32 is provided adjacent the base of positioner housing 10b and is adapted to admit a pressurized fluid to move power piston 24 upwardly. Port 33 is located in cap 31 and is adapted to admit a pressurized fluid into positioner housing 10b to move power piston 24 downwardly. Ports 34, 35, 36 and 37 are discharge ports in the walls of positioner housing 10b and are spaced along the length of the housing. For design expediency, port 34 is located in cap 31. Thus, there is one discharge port for every position of power cylinder 24, hence for each position of valve stem 23.

The positioning of power piston 24 will be explained in conjunction with automatic pilot valve 12 as shown in Fig. 1, but it is to be clearly understood that many other types of valving apparatus can be used to close off the flow from, or open the flow to, the various ports in housing 10b of a pressurized fluid.

Pilot valve 12 includes six individual valve elements, each controlling the flow in a pipe connected with one of the aforementioned ports (32–37) in positioner housing 10b. For ease of understanding, I have designated the pilot valve element corresponding to a particular port with the same number but 100 greater. Thus, pilot valve element 132 regulates the flow to bottom inlet port 32, element 133 to top inlet port 33. In the same fashion, elements 134 to 137 regulate the flow from outlet ports 34 to 37, the pilot valve elements and the ports being connected by piping 11.

Valve elements 132 and 133 are connected to a source of pressurized fluid, which in thte preferred embodiment is the same raw water coming into valve 10 by pipe 20. Valve elements 134–137 are connected to a drain. One means by which pilot valve elements 132–137 can be actuated is by cams 132a–137a, respectively, driven by motor M, which is adapted to be electrically timed.

By selectively operating pilot valve elements 132–137, it is possible to position piston 24, hence valve stem 23 in any of the positions shown in Figs. 3–6, achieving any position from any other position without the need for stopping at intermediate positions. For example, the position of piston 24 in Fig. 4 wherein the piston is at the top of the positioner housing 10b is achieved by opening inlet valve element 132 and drain valve element 134, thus causing water to enter the bottom of housing 10b through inlet port 32 and force piston 24 upwardly which forces water out of drain port 34. From the valve stem position shown in Fig. 4, the position shown in Fig. 5 can be achieved by closing pilot valve elements 132 and 134 and opening valve elements 133 and 137. Pressurized water will then flow into the top of housing 10b through inlet port 33 and the water under piston 24 will drain out of outlet port 37 through pilot valve element 137 to drain. The position in Fig. 6 is achieved by closing valve elements 133 and 137 and by opening pilot valve elements 132 and 135, thereby introducing water under piston 24 and permitting water to drain out of outlet port 35 from over piston 24. To move piston 24 from the position shown in Fig. 6 to that of Fig. 3, it is merely necessary to close pilot valve elements 132 and 135 and open valve elements 133 and 136. When piston 24 reaches port 36, there can be no further movement since the water below piston 24 cannot escape to drain. The Fig. 4 position is achieved by closing valve elements 133 and 136 and opening elements 132 and 134 as described above.

From the foregoing description of the operational sequence shown in Figs. 3-6 of the drawing, it is to be noted that the only limitations in moving piston 24 are (1) that an outlet port for pressure draining be opened corresponding to the position desired, all other outlet ports being closed, and (2) an inlet port be opened on that end of the housing in which pressure is to be applied, or in other words, the end from which the piston is to be moved. Thus, it is possible by selecting a cam adjustment to provide any operational sequence desired. The spacing and arrangement of ports 34-37 are a function of the design of valve housing 10a and the spacing of chamber-providing piston elements 25.

In the preferred embodiment pictured in the drawings, it is to be noted that some of the piston elements 25 (commonly called spools) serve a dual purpose. The two piston elements immediately adjacent the piston element which is integral with the power piston not only operate to provide chambers for regulating the flow of fluids within control valve housing 10a, but also act as a seal between valve housing 10a and positioner housing 10b. This can best be seen by comparing the functions of spool 25' in Figs. 5 and 6. Piston element, or spool 25', is in spaced relation and adjacent to the piston element which is integral with power piston 24. In Fig. 5, it serves as the upper wall for the brine passage ending at outlet 14a. In Fig. 6, the alternative function of spool 25' can be seen clearly in that it is the seal between positioner housing 10b and valve housing 10a. Spool 25'' is mounted on valve stem 23 adjacent spool 25' and is in spaced relation thereto and on the opposite side thereof from power piston 24. The dual function of spool 25'' can be best seen by comparing the valve stem positions in Figs. 3 and 4. In Fig. 3, it serves as the upper wall defining the raw water channel ending at outlet port 14a, and in Fig. 4 it serves as a seal between positioner housing 10b and valve housing 10a.

It is to be clearly understood that the foregoing detailed description is for purposes of understanding only and that no unnecessary limitations are to be inferred therefrom, as modifications will be obvious to those skilled in the art.

I claim:
1. In a control valve for water softening apparatus the combination comprising a valve housing having a longitudinal bore, a plurality of ports in said housing, a valve shaft slidably mounted in said housing, a plurality of piston elements mounted on said shaft in sealingly sliding engagement with the bore of said housing, said piston elements being adapted to form a plurality of chambers within said housing whereby said valve simultaneously controls the flow of different fluids through said ports; a positioner for said valve stem comprising a housing, a portion of said valve stem slidingly mounted in said positioner housing, a positioner piston mounted on said valve stem portion, four outlet ports in said housing disposed along the length thereof adapted to vent pressurized, untreated water, inlet ports on said housing adjacent the ends thereof adapted to admit pressurized untreated water; and an automatic regulator for said positioner having at least two inlet valve elements and four drain valve elements, said inlet valve elements being connected with a source of pressurized fluid and one of said inlet ports, said drain valve elements being connected with a drain and one of said outlet ports, and timing means for selectively operating together one of said inlet valve elements and one of said outlet valve elements.

2. In a control valve for water softening apparatus the combination comprising a valve housing having a longitudinal bore, a plurality of ports in said housing, a valve shaft slidably mounted in said housing, a plurality of piston elements mounted on said shaft in sealingly sliding engagement with the bore of said housing, said piston elements being adapted to form a plurality of chambers within said housing whereby said valve simultaneously controls the flow of different fluids through said ports; a positioner for said valve stem comprising a housing, a portion of said valve stem slidingly mounted in said positioner housing, a positioner piston mounted on said valve stem portion, four outlet ports in said housing disposed along the length thereof adapted to vent pressurized, untreated water, inlet ports on said housing adjacent the ends thereof adapted to admit pressurized untreated water, said piston elements adjacent the said positioner piston being in such spaced relation thereto as to provide chamber forming walls in one position of said valve stem and a liquid seal between said positioner and said control valve in another position of said valve stem; and an automatic regulator for said positioner having at least two inlet valve elements and four drain valve elements, said inlet valve elements being connected with a source of pressurized fluid and one of said inlet ports, said drain valve elements being connected with a drain and one of said outlet ports, and timing means for selectively operating together one of said inlet valve elements and one of said outlet valve elements.

3. In a control valve for water softening apparatus, the combination comprising a valve housing having a longitudinal bore, a plurality of ports in said housing, a valve shaft slidably mounted in said housing, a plurality of piston elements mounted on said shaft in sealingly sliding engagement with the bore of said housing, said piston elements being adapted to form a plurality of chambers within said housing whereby said valve simultaneously controls the flow of different fluids through said ports; a positioner for said valve stem comprising a housing, a portion of said valve stem slidingly mounted in said positioner housing, a positioner piston mounted on said valve stem portion, a plurality of ports in said housing disposed along the length thereof adapted to vent pressurized, untreated water, inlet ports on said housing adjacent the ends thereof adapted to admit pressurized untreated water; and an automatic regulator for said positioner having inlet valve elements for each of said inlet ports and drain valve elements for each of said outlet ports, said inlet valve elements being connected with a source of pressurized fluid and one of said inlet ports, said drain valve elements being connected with a drain and one of said outlet ports, and timing means for selectively operating together one of said inlet valve elements and one of said outlet valve elements.

4. A control valve unit for a water softening apparatus adapted to direct fluids for service, bed countercurrent flushing, brine regeneration, and bed direct current rinsing comprising: a tubular body provided with a plurality of ports disposed longitudinally thereof, a valve shaft slidably mounted in said body, a plurality of piston elements mounted on said shaft in sealingly sliding engagement with the bore of said body, one end of said body being enlarged to form a positioner cylinder, a positioner piston mounted on the part of said shaft in said cylinder, means for positioning said positioner piston, said positioning means including a plurality of ports in the side wall of said positioner cylinder, the positioner piston being moved a unit distance when pressure is applied to one side thereof and the port adjacent the other side thereof is opened, the ports in said body being spaced as follows: a drain port adjacent said positioner cylinder and spaced therefrom a double unit distance, spaced a unit distance from said drain port, a pair of ports, one of which is a by-pass port and the other a top bed tank port, spaced a double unit distance from the said pair of ports, a second drain port, spaced consecutively at unit distances from said second drain port, a bottom bed tank port, a service supply port, a service return port, and a bottom by-pass port, spaced a double distance from said bottom by-pass port, a brine supply port, said piston elements being spaced consecutively from the positioner piston as follows: a double unit distance, a unit distance, a unit distance, a unit distance, a double unit distance, a double unit distance, a double unit distance, a triple unit distance, and a unit distance; the first four of said piston elements providing chamber-forming walls in one position of said valve stem whereby the flow of fluid is directed, and liquid seals between said positioner cylinder and the remainder of said body in other positions.

References Cited in the file of this patent

UNITED STATES PATENTS

| | | |
|---|---|---|
| 1,131,182 | Turner | Mar. 8, 1915 |
| 1,942,882 | Sutherland | Jan. 9, 1934 |
| 2,012,194 | Hughes | Aug. 20, 1935 |
| 2,167,281 | Monroe | July 25, 1939 |
| 2,219,965 | Smitt | Oct. 29, 1940 |
| 2,228,700 | Hamner | Jan. 14, 1941 |
| 2,391,578 | Lawrence | Dec. 25, 1945 |
| 2,398,997 | Berry | Apr. 23, 1946 |
| 2,635,634 | Thurber | Apr. 21, 1953 |
| 2,642,087 | Christensen | June 16, 1953 |
| 2,661,724 | Blenkle | Dec. 8, 1953 |